United States Patent [19]

Benson

[11] 4,135,372

[45] Jan. 23, 1979

[54] UNIVERSAL JOINT

[75] Inventor: Carl F. Benson, Torrington, Conn.

[73] Assignee: The Torrington Company, Torrington, Conn.

[21] Appl. No.: 739,515

[22] Filed: May 4, 1977

[51] Int. Cl.² .............................................. F16D 3/26
[52] U.S. Cl. ................................... 64/17 SP; 64/17 R; 64/16
[58] Field of Search .................. 64/17 SP, 21, 16, 19, 64/17 R, 6; 403/150, 152, 158, 146, 57, 58

[56] References Cited

U.S. PATENT DOCUMENTS

| | | | |
|---|---|---|---|
| 1,071,377 | 8/1913 | Wilkinson | 403/58 |
| 1,371,750 | 3/1921 | Fox | 403/58 |
| 1,806,723 | 5/1931 | Tetrault | 64/17 R |
| 1,926,858 | 9/1933 | Peters | 64/17 R |
| 2,826,052 | 3/1958 | Stillwagon | 64/17 SP |
| 2,977,776 | 4/1961 | Quinn | 64/17 R |
| 3,045,454 | 7/1962 | Rueb | 64/17 SP |
| 3,465,546 | 9/1969 | Spyra | 64/17 SP |
| 3,593,978 | 2/1971 | Flitz | 92/187 |
| 3,930,381 | 1/1976 | Hall | 64/17 R |
| 4,018,104 | 4/1977 | Bland | 403/146 |

FOREIGN PATENT DOCUMENTS

| | | | |
|---|---|---|---|
| 589538 | 6/1947 | United Kingdom | 403/158 |
| 974270 | 11/1964 | United Kingdom | 403/158 |
| 1228356 | 4/1971 | United Kingdom | 403/58 |

Primary Examiner—Samuel Scott
Assistant Examiner—R. C. Turner
Attorney, Agent, or Firm—Frank S. Troidl

[57] ABSTRACT

A pre-loading structure between the driving member and the driven member removes torsional backlash from a universal joint by pre-loading a pair of blocks against and substantially encompassing the driving member. The blocks are dimensioned so that the inside of each block has surfaces which face one another in spaced relationship to provide a clearance between them to allow the blocks to be moved toward each other as wear occurs to continually maintain the pre-load between driving and driven member.

7 Claims, 10 Drawing Figures

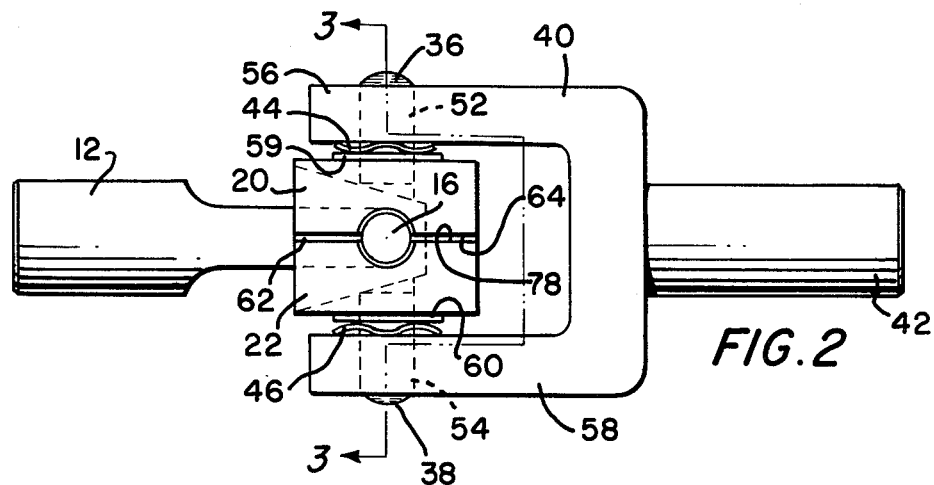
FIG. 2
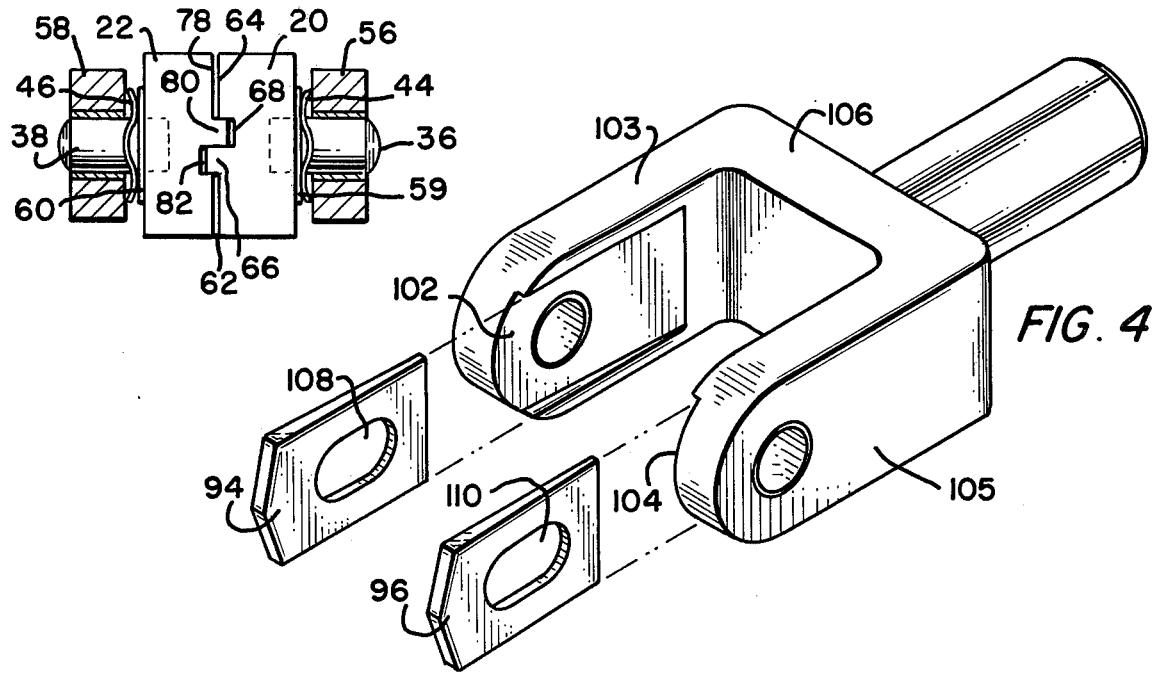
FIG. 3
FIG. 4
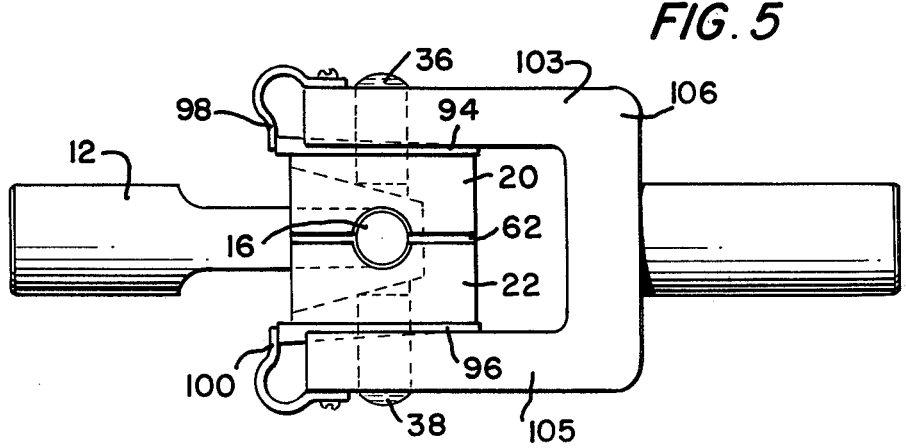
FIG. 5

UNIVERSAL JOINT

This invention relates to universal joints. More particularly, this invention is an improved pre-loaded universal joint.

There are many applications for universal joints which have small, compact structures and which have smooth action, zero backlash, and lubrication for life. A typical application is in an automotive steering shaft line beneath a tilt steering wheel, which wheel must operate at various angles to the steering column. The increasing use of power steering with the attendant low steering effort at the steering wheel makes it particularly important that a universal joint in the steering shaft line must be very smooth in action with no perceptible backlash. Stickiness and backlash destroy the "feel" of the steering because of the easy response and the sensitivity of the power steering system. Manual steering systems must also be free of perceptible backlash and must operate with the minimum practical manual effort.

The pre-load construction of this invention gives no perceptible backlash. Also, most of the contacting parts subject to friction may be provided with permanent lubrication. This new universal joint is inexpensive to manufacture and provides a high load capacity with a small size. There is an automatic compensation for wear to maintain the pre-load within the joint.

Briefly described, the new pre-loaded universal joint includes a driving member and a driven member. Although for convenience one particular shaft member is referred to as the driving member and the other shaft member is referred to as the driven member, in actual fact either member may be the driver and the other member would be the driven member. The interconnecting structure between the driving member and the driven member comprises a pair of blocks substantially encompassing and pressed against the driving member. The blocks are dimensioned so that the inside of each block has surfaces which face one another in spaced relationship to provide a clearance between them to allow the blocks to be moved toward each other as wear occurs in the universal joint, to continually maintain the pre-load between driving and driven members throughout the working life of the universal joint. A pre-loading means comprising a block contacting member is in contact with the outside surface of each block, forcing each block against the driving member at all times and maintaining that forceful contact.

The invention, as well as its many advantages, may be further understood by reference to the following detailed description and drawings in which:

FIG. 2 is a plan view of the assembled universal joint of FIG. 1;

FIG. 3 is a view, partly in section, taken along lines 3—3 of FIG. 2 and in the direction of the arrows;

FIG. 4 is an exploded perspective view showing the use of wedges in the yoke of the driven member of another embodiment of the new pre-loaded universal joint, the wedges forming part of the pre-loading structure;

FIG. 5 is a plan view of an assembled universal joint using the wedges and yoke of FIG. 4;

In the various Figures, like parts are referred to by like numbers.

Figure 1:
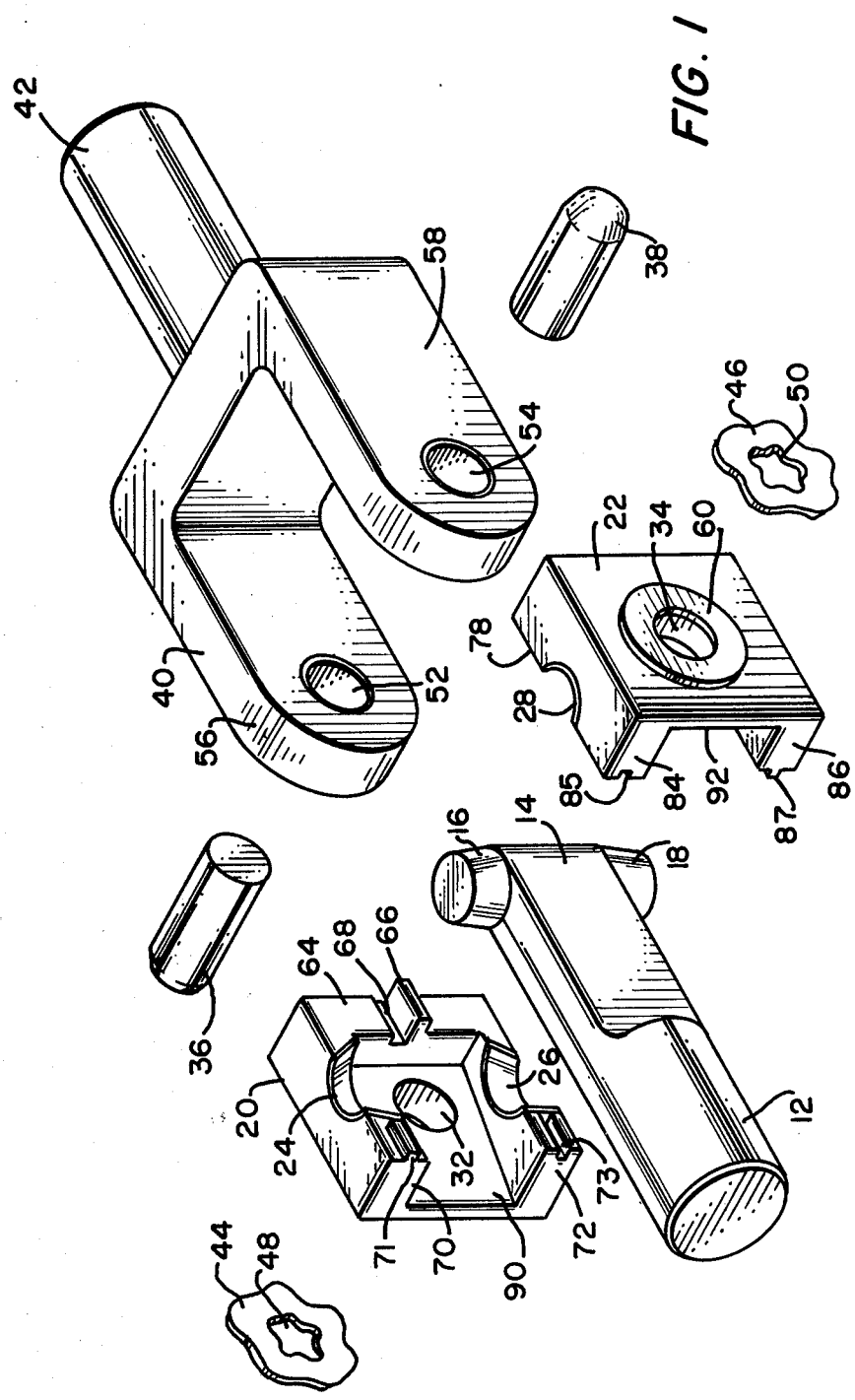
FIG. 1 is an exploded perspective view illustrating one embodiment of the new pre-loaded universal joint.

Referring to the drawings, and more particularly to FIG. 1, the joint includes a driving member 12 terminating in a T-shaped head 14 with two oppositely extending journal trunnions 16 and 18. The trunnions 16 and 18 may be cylindrical but are preferably conical as shown to provide a self-centering action in the mating bearing surfaces of a pair of blocks 20 and 22.

Blocks 20 and 22 substantially encompass the end of the shaft 12. The inside surface of each block 20 and 22 has two vertically spaced semi-conical bores so that when the joint is assembled, two vertically spaced conical bores are provided to receive and mate with the conical trunnions 16 and 18 on driving shaft 12. The semi-conical bores 24 and 26 on block 20 combine with semi-conical bores 28 and another semi-conical bore (not shown) on block 22 when the joint is assembled to provide the mating bearing surfaces for trunnions 16 and 18. In the case of cylindrical trunnions, the mating bearing surfaces on the blocks are semicylindrical.

Blocks 20 and 22 also have cylindrical bores 32 and 34, respectively, with a common centerline at right angles to and intersecting the centerline of the mating surfaces for trunnions 16 and 18. The bores 32 and 34 are sized to provide a press fit with pins 36 and 38 at assembly. At assembly the blocks 20 and 22 are assembled over the trunnions 16 and 18 and inserted into a yoke 40 of a driven member 42 together with block contacting members such as spring tempered wave washers 44 and 46. The bores 48 and 50 of the washers 44 and 46, respectively, and bores 32 and 34 in the blocks 20 and 22, respectively, are located concentrically to bores 52 and 54 in arms 56 and 58, respectively, in yoke 40, and the pins 36 and 38 are pressed through the bores 52 and 54, respectively, in the assembly process, into a press fit in the bores 32 and 34 of the blocks 20 and 22. The pins 36 and 38 are a slide fit in bores 52 and 54.

Trunnions 16 and 18 are machined to a smooth finish and the trunnion mating bearing surfaces in the blocks are preferably treated to produce conforming surfaces of low friction dry film lubricant. The treatment may be any of the many known resin and filler combinations. It may be bonded to the block surface. Alternatively, a loose film or bushing may be laid between the mating surfaces. A typical combination might be teflon flock particles in a thermo setting phenolic resin. While durability of operating characteristics are highly dependent on the specific composition of the film, the specific composition is not pertinent to the principles of construction of the joint. Suffice to say, the film may have a co-efficient of friction as low as 0.01 and load carrying capacity as high as 50,000 lbs. per square inch. The same dry lubricant film may be applied to the outside of each block 20 and 22. In the embodiment shown in FIGS. 1 through 3, the dry film is applied in the form of wafers 59 and 60 (see FIG. 2 and FIG. 3) either bonded to the surface or laid against the surface. These are flat areas surrounding bores 32 and 34 on blocks 20 and 22, respectively. The wafers 59 and 60 are at least as large in diameter as the wave washers 44 and 46 against which they swivel. Alternatively, the low friction film may be bonded to one or each side of each wave spring washer.

As can be seen from looking at FIG. 2 and FIG. 3, the inside surface of each block has plane surfaces which face one another in spaced relationship to provide a clearance gap 62. The inner dimension between the arms 56 and 58 of yoke 40 and the overall width of blocks 20 and 22 as assembled on the trunnions 16 and 18, are held to give specific side clearance dimensions between the blocks and the yoke arms. These dimensions and the spring rate of wave washers 44 and 46 are controlled so that the washers operate in these side clearances within a specific range of compression forces, which effectively pre-loads the operating components of the universal joint throughout the working lifetime of the joint. The initial clearance gap 62 is made wide enough to accommodate whatever wear occurs in the associated bearing surfaces in the blocks during the expected life of the joint, always leaving space for the facing surfaces of the blocks to approach one another. Any wear is automatically compensated for, since the blocks move slightly towards one another under spring pressure as wear occurs and pre-load on the joint is maintained. Of course other types of springs may be used in place of the wave washers to establish and maintain the pre-load. It is also possible to use a single spring, pre-loading its block and the driving member and the second block against the opposite yoke arm instead of against another spring.

The inside surfaces of each of the blocks 20 and 22 may be provided with interfitting tongue and groove means to help prevent relative movement of the blocks in both vertical directions and longitudinal rotation of the blocks relative to one another. The pins 36 and 38 also help prevent the relative vertical movement, and trunnions 16 and 18 help to prevent the relative longitudinal rotation. Referring to FIGS. 1 and 3, the inside surface 64 of block 20 includes a horizontally extending tongue 66 with an adjacent groove 68. The inside surface 78 of block 22 (see FIG. 3) includes a tongue 80 and an adjacent groove 82. The inside surfaces across the bearing area from inside surface 64 include vertically spaced horizontal shoulders 70 and 72 having respectively a tongue 71 and a groove 73. Also, looking at FIG. 1, it can be seen that the inside surfaces of block 22 across the bearing area from inside surface 78 also includes vertically spaced horizontal shoulders 84 and 86, having respectively a groove 85 and a tongue 86. At assembly of the universal joint, the tongues 66, 80, 71, and 87 slide into respectively the grooves 82, 68, 85, and 73.

The tongues and the grooves are symmetrically located on either side of the longitudinal centerline of the block, making the right and the left hand blocks identical. Although this is not critical to the invention, it does help to reduce production costs. The interfitting tongues and grooves act to key the blocks together and help to prevent the blocks from shifting under load and to keep the driving member clearance pockets 90 and 92 in the inside of blocks 20 and 22, respectively, in alignment. As can be seen referring to FIG. 3, the depth of the grooves 68 and 82 is at least as great as the height of the tongues 80 and 66 to preserve clearance for pre-load as the trunnion bearing surfaces wear and the blocks approach each other under their pre-load.

Journal bores 52 and 54 in the yoke member 40 may also be provided with the dry film lubricant and have a slide fit with essentially zero clearance on pins 36 and 38. These pins are press fitted in assembly into the blocks 20 and 22 and oscillate during operation in the bores 52 and 54. Here again the film is preferably a dry lubricant in a thermo set resin bonded to the surfaces or onto the mating bearing surfaces of the pins, but it might also be laid freely between the mating surfaces as a film or bushing.

A feature of the embodiment shown in FIGS. 1 through 3, inclusive, is that the pre-loading springs may be so constructed in compression rate as to maintain a pre-loaded assembly condition with zero torsional backlash up to the limit of any specific maximum desired working torque load on the universal joint. Should an occasional heavier torque or shock load be applied, the blocks 20 and 22 will be spread apart slightly by trunnions 16 and 18, flattening or compressing the springs to a greater load level and resulting in torsional displacement between driving member 12 and driven member 42. However, the torsional displacement of the shafts 12 and 42 will be small in magnitude and the joint will immediately return to its original pre-loaded condition and position upon the removal of the unusual load. The action would be "soft" in action, acting as a cushion or shock absorber with no noticeable looseness or "click".

In the embodiment shown in FIG. 4 and FIG. 5, the wave washers are replaced by thin wedges 94 and 96 constantly biased by springs 98 and 100, respectively, (see FIG. 5) to continually remove all "play" or looseness between driving and driven members at assembly and during lifetime wear in the system. The wedges are made to a specific included angle of, say, between 2° and 7°, preferably in the lower part of the range, and fit slidingly into mating angled grooves 102 and 104 with the same angle taper formed in the inner surfaces of arms 103 and 105 of yoke 106. Oblong holes 108 and 110 in wedges 94 and 96, respectively, give clearance between the pins 36 and 38 and the wedges and allow the wedges to travel past the pins (see FIG. 5) in order to accommodate the wear in the low friction surfaces of the blocks 20 and 22 throughout the working life of the joint. The oblong holes could as easily be open ended slots. Experience has shown that in one specific application and loading condition, this lifetime wear is of the order of 0.005 inches of thickness of the lubricant film. A 2° wedge would compensate for this in a longitudinal movement of 0.072 inches. The slot-like holes in the washers must provide clearance for at least this much movement. We would normally provide for greater movement of the wedges, to allow for manufacturing tolerances and inaccuracies, and greater wear. In the embodiment of FIG. 4 and FIG. 5, the action of the wedges 94 and 96 constantly removes backlash during wear and maintains the pre-load. Instead of providing a low-friction film on the blocks, we may provide the film on one or both sides of each wedge. We might also use just a single wedge, pre-loading the parts against the opposite yoke arm.

Figure 6:
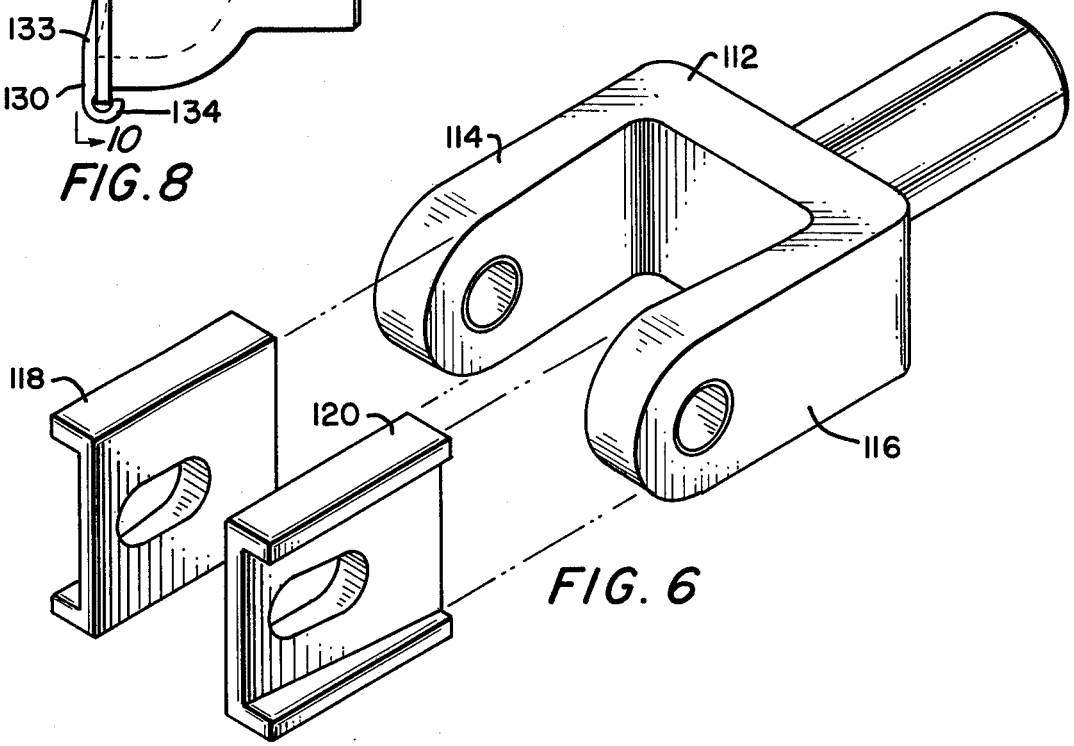
FIG. 6 is an exploded perspective view of another embodiment of wedge structure used with a yoke of the driven member, the wedge structure forming part of the pre-loading construction.
Figure 7:
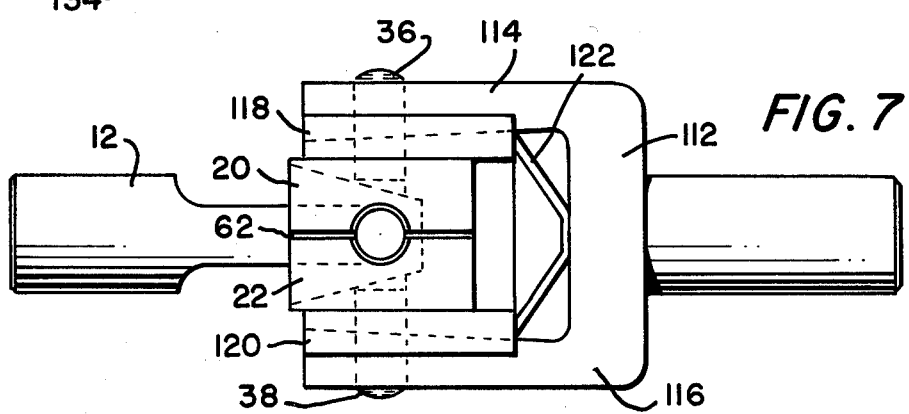
FIG. 7 is a plan view of an assembled pre-loaded universal joint using the wedge structure and yoke structure of FIG. 6.

FIG. 6 and FIG. 7 show a yoke 112 with the insides of the arms 114 and 116 tapered to form a dovetail-like opening between yoke arms. Alternatively, the arms might be made with uniform thickness but bent at the taper angle toward each other. In this case, the wedges 118 and 120 are pressed from the inside of the yoke toward the open end by springs such as the spring 122 (see FIG. 7).

The wedges 118 and 120 have top and bottom flanges which slidingly encompass the top and bottom surfaces of the yoke arms to prevent undesired wedge rotation or vertical movement relative to the arms while allowing longitudinal movement. The wedges 94 and 96 might also be made similarly to fit on their mating yoke arms and remove the necessity of machining or coining the grooves 102 and 104.

Figure 8:
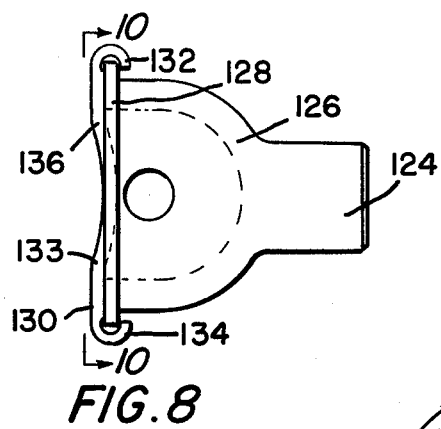
FIG. 8 shows another structure wherein the driven member includes a bell-shaped housing with the spring means for biasing the wedges shown in its position before the wedges are in place.
Figure 10:
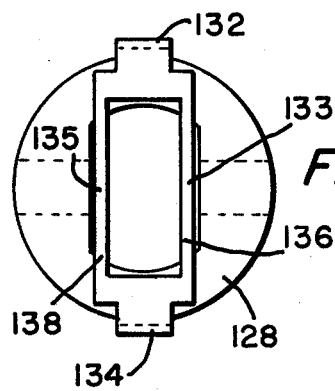
FIG. 10 is a view taken along lines 10—10 of FIG. 8 and in the direction of the arrows.
Figure 9:
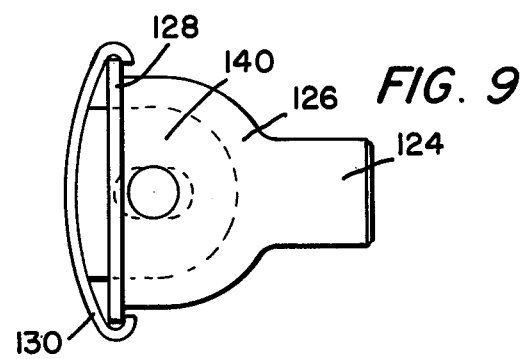
FIG. 9 is a view similar to FIG. 8, but including the inserted wedges.

In the embodiment shown in FIGS. 8 through 10, the driven member 124 has a different configuration than the driven members shown in the other embodiments. The driven end connected through the interconnecting means to the driving member includes a bell-shaped housing 126 with an outer annular flange 128. The spring 130 is made of sheet metal which is normally flexed at the centers 133 and 135 of side strips 136 and 138, respectively, with the ends 132 and 134 curled around the flange 128. The center areas 133 and 135 of the side strips 136 and 138 are flexed outwardly by the wedges and resiliently bear against the outer edges of the wedges such as wedge 140 shown in FIG. 9 to constantly urge the wedges into the decreasing wedge-shaped gap between housing and blocks to maintain the pre-load and constantly remove all play.

I claim:

1. A universal joint comprising: a driving member; a driven member; means interconnecting said driving member and said driven member, said interconnecting means comprising a pair of blocks substantially encompassing the driving member, said blocks being dimensioned such that the inside of each block has surfaces which directly face one another in spaced relationship to provide a clearance; and pre-loading means comprising a block contacting member in contact with the outside surface of a block and low friction dry film lubricant bearing surfaces located between said blocks and said driving member.

2. A universal joint in accordance with claim 1 wherein: there are two block contacting members, each contacting member being a spring located in a space between a block and the driven member.

3. A universal joint in accordance with claim 1 wherein: the pre-loading means comprises two wedges, one wedge in each space between the outside face of a block and the driven member, and spring means connected to the driven member, said spring means being adapted to contact the wedges to exert the pre-load.

4. A universal joint in accordance with claim 2 wherein: the means interconnecting the driving member and the driven member includes a pin extending from the outside surface of each block into the driven member and the pre-loading means includes a spring tempered wave washer on each pin and adapted to pre-load the blocks.

5. A universal joint in accordance with claim 1 wherein: the insides of the blocks are provided with interfitting tongue and groove means to prevent relative movement of the blocks in both vertical directions, and to prevent longitudinal rotation of the blocks relative to each other.

6. A universal joint in accordance with claim 1 wherein: the inside surface of each block has two vertically spaced semi-conical bores so that two vertically spaced conical bores are provided, the driving member is provided with conical trunnions adapted to fit into the conical bores formed by the block members, the driven member includes a yoke with each arm of the yoke having a pin hole, a pin extends from each of the blocks through a pin hole in an arm of the yoke, the outside of each block has a low friction dry film lubricant wafer surrounding the pin hole of the block, and the pre-loading means is a spring tempered wave washer located about each pin and adjacent to the low friction dry film lubricant wafer, said wafer being at least as large as the spring tempered wave washer, and the conical trunnions on the driving member and the semi-conical bores on the inside surfaces of the blocks are treated with a low friction dry film lubricant.

7. A universal joint comprising: a driving member having a T-shaped driving end with the cross bar of the T comprising conical bearing trunnions; a driven member at least partially surrounding the driving member; interconnecting means between said driving and said driven members, said interconnecting means comprising a pair of block substantially encompassing the T-shaped end of the driving member and having low friction dry film lubricant bearing surfaces in conforming contact with the trunnions; and pre-loading means comprising at least one block contacting member in forceful contact with and located between the outside surface of a block and the inside surface of the driven member.

* * * * *